3,440,024
CRYSTALLIZATION OF CALCIUM HYPOCHLO-
RITE DIHYDRATE EMPLOYING ZINC IONS
John P. Faust and Homer L. Robson, Hamden, Conn.,
assignors to Olin Mathieson Chemical Corporation, a
corporation of Virginia
No Drawing. Filed Oct. 19, 1966, Ser. No. 587,701
Int. Cl. B01j 17/04
U.S. Cl. 23—300                                      10 Claims This invention relates to improvements in the production of calcium hypochlorite. More particularly, it relates to the crystallization of calcium hypochlorite dihydrate from aqueous medium in the presence of zinc ions.

The last steps in the commercial production of calcium hypochlorite are the crystallization of calcium hypochlorite dihydrate from an aqueous medium, separation of the crystals from the aqueous medium and drying the dihydrate to produce anhydrous calcium hypochlorite.

Unfortunately for all commercial processes, the dihydrate crystals are small, thin and highly twinned. The twinned crystals generally have the shape of the leaves of an open book. They trap large quantities of mother liquor and are difficult to wash and separate. Individual leaves are fragile and fragment easily to plug filters and produce wet filter cakes. The filter cakes prepared by vacuum filtration of slurries of badly twinned dihydrate crystals sometimes contain 50 to 55% of mother liquor. Such cakes, when dried, are usually too low in calcium hypochlorite and too high in impurities to be commercially competitive. The drying process is slow and attempts to hasten it by the use of elevated temperatures results in increased decomposition, lower test hypochlorite and higher content of impurities. Pressure filtration under several thousand pounds per square inch reduces the water content of the cake to as low as 30% but this operation is expensive.

Attempts to improve the filterability of slurries of calcium hypochlorite dihydrate have achieved limited degrees of success. U.S. Patent 1,937,230 discloses the formation of calcium hypochlorite dihydrate crystals of somewhat improved filterability by partial chlorination of a lime slurry, crystallizing a basic calcium hypochlorite, separating the crystals, resuspending the crystals and completing the chlorination to precipitate neutral calcium hypochlorite dihydrate crystals from liquors lower in calcium chloride content than otherwise produced, for example, by chlorination of a lime slurry. Improvement in filterability appears to be obtained by this method only when hexagonal crystals of dibasic hypochlorite are produced and separated as intermediate. U.S. Patent 2,587,071 discloses a method of "salting out" a readily filterable product but requires that the solution be free of sulfate and that temperature and rate of salt addition be closely controlled. Another reagent, e.g., barium chloride, is required to remove sulfate which adds the expense of the reagent and of another process step to the cost of the operation. U.S. Patent 2,007,429 proposes precipitation of the dihydrate using large quantities of recycle liquids which requires additional equipment or limits capacity.

Broadly, the process of this invention consists of crystallizing calcium hypochlorite dihydrate from aqueous medium containing zinc ions. Surprisingly, the zinc ions modify the crystal habit of calcium hypochlorite dihydrate to form crystals which are larger and, more importantly, are not twinned. The crystals filter or centrifuge much more rapidly to yield damp cake which contains significantly less water or mother liquor. The crystals dry more rapidly and substantially purer calcium hypochlorite is produced.

More particularly, the untwinned crystals of calcium hypochlorite produced by the process of the present invention are mostly 60 to 90 microns wide and 6 to 7 microns thick in contrast to crystals produced in the absence of zinc which are mostly 10 to 20 microns wide and 0.5 to 2 microns thick. The novel crystals are stronger and less readily crushed to form fines which clog filters and impede separation of crystals from liquor. The novel crystals are substantially untwinned and entrap less aqueous mother liquor. They are more easily and thoroughly washed and yield a dried calcium hypochlorite higher in available chlorine and lower in impurities.

A further unpredictable advantage of the process of the present invention is that a whiter calcium hypochlorite product is obtained. Commercial lime used in producing calcium hypochlorite usually contains a minor but significant content of manganese. In the chlorination of lime slurries, a pink to purple color results and the final, anhydrous calcium hypochlorite product is off-white. When the calcium hypochlorite is crystallized from aqueous medium containing zinc ions a product is obtained which is about 3 points whiter by G.E. Reflectance than calcium hypochlorite crystallized similarly in the absence of zinc ions, both having particle size of about 20 mesh.

The improvement in crystal structure of calcium hypochlorite dihydrate allows chlorination of thicker lime slurries and thus increases the capacity of existing equipment. Reduction of the water content of lime slurries from 12 moles to 9 moles of water per mole of lime effects an increase in capacity and yield and still produces a purer product in less time.

Any method previously known to the art for the formation of neutral calcium hypochlorite is suitable for the purposes of the present invention with the novel incorporation of zinc ions. Calcium hypochlorite is commonly produced by chlorination of an aqueous slurry of lime. Quicklime is first hydrated with water in known manner or hydrated lime is slurried with water and then chlorinated. Equimolar proportions of calcium hypochlorite and calcium chloride are formed. Calcium hypochlorite is also produced by chlorination of "mixed alkalies," e.g., caustic soda and lime in a weight ratio of 40:37 in the manner taught in U.S. Patent 1,718,285. By this method the calcium chloride by-product of lime chlorination is entirely converted by the sodium hypochlorite to calcium hypochlorite and sodium chloride. Calcium hypochlorite is also suitably produced by neutralizing a slurry of dibasic calcium hypochlorite or lime with aqueous hypochlorous acid. In some processes, dibasic or hemibasic calcium hypochlorites are first formed, usually by partial chlorination of a lime slurry, separation, resuspension in water and completion of the process by chlorination or by neutralization with aqueous hypochlorous acid. In still another process, "triple salt" having the formula $Ca(OCl)_2 \cdot NaOCl \cdot NaCl \cdot 12H_2O$ is first formed by chlorination of mixed alkalies at low temperatures, separation and reaction of the triple salt with a chlorinated lime slurry containing calcium chloride in amounts equivalent to the sodium hypochlorite content of the triple salt. The resulting calcium hypochlorite contains sodium chloride as an inert, innocuous diluent but is free from deleterious sodium hypochlorite and calcium chloride.

According to the process of the invention, a source of zinc ions is introduced into any of the processes for producing calcium hypochlorite. Improved results are obtained even though zinc ions are present only during a portion of the operation. Best results are obtained, however, when zinc ions are present at all times during the calcium hypochlorite-forming and crystallizing process.

Any source of zinc ions is suitable for introduction into the aqueous medium. The term "zinc ions" is used in the present specification and claims to include zinc in the form of zincate ions. When the hypochlorite is produced by chlorination, any source of zinc which is converted into zinc ions by aqueous chlorine is suitable. For this reason, metallic zinc is useful and zinc dust is particularly suitable since it is quickly converted to zinc chloride. Zinc dust is the cheapest source of zinc and is a preferred source. Other common sources of zinc are its oxide, hydroxide and salts. Zinc salts of organic or inorganic acids are suitable including:

| Zinc chloride   | Zinc acetate   |
| Zinc bromide    | Zinc oxalate   |
| Zinc iodide     | Zinc butyrate  |
| Zinc nitrate    | Zinc benzoate  |
| Zinc sulfate    | Zinc citrate   |
| Zinc carbonate  | Zinc formate   |
| Zinc fluoride   | Zinc picrate   |
| Zinc phosphates | Zinc tartrate  |
| Zinc sulfide    | Zinc valerate  |
| Zinc borate     | Zinc laurate   |

Even very minor amounts of zinc ions produce improved results but generally a molar ratio of Zn/Ca of at least about 0.001:1 is suitable to obtain useful improvement in crystal structure. The molar ratio is suitably as much as 0.1:1 but more zinc is not harmful. Some of the zinc introduced appears in the product but the amount is insignificant as a contaminant or in any effect on stability or usefulness of the calcium hypochlorite product.

Certain extremely difficultly soluble zinc salts, for example, zinc naphthenate and zinc stearate only very slowly contribute zinc ions to an aqueous medium and, for this reason, are less advantageous in the process of this invention. Some zinc salts which react with calcium or with hypochlorite, e.g., the fluoride or oxalate, are nevertheless useful in the process of this invention since the production of the insoluble calcium salt or consumption of available chlorine is negligible in amount.

Example I

A slurry was prepared by stirring a mixture of 4 grams of zinc dust, 148 grams of commercial hydrated lime and 450 grams of water. Maintaining a temperature of 35 to 40° C., chlorine gas was passed into the stirred slurry at approximately 0.8 gram per minute until 105 grams was added. The solid phase of the slurry at this point is largely dibasic calcium hypochlorite having the formula, $Ca(OCl)_2 \cdot 2Ca(OH)_2$. Temperature was lowered and maintained at 20° C. while chlorine was introduced at a rate of approximately 0.4 gram per minute until an additional 34 grams of chlorine was introduced.

The resulting slurry was tan colored instead of the dark pink or purple color usually obtained without zinc. The crystals of calcium hypochlorite dihydrate in the slurry were large and square or diamond-shaped about 50 to 80 microns on a side and 4 to 7 microns thick with little twinning. When the same procedure was repeated omitting zinc, the crystals were small, 10 to 20 microns on a side, 0.5 to 1 micron thick and were highly twinned.

Example II

The procedure of Example I was repeated using only 0.4 gram of zinc dust. The molar ratio of Zn/Ca was 0.003:1. The resulting dihydrate crystals had substantially the quality of those produced in Example I.

Example III

The procedure of Example I was repeated substituting 0.25 gram of zinc oxide for the zinc dust. The molar ratio of Zn/Ca was 0.0016:1. Easily filterable dihydrate crystals were produced.

Example IV

The procedure of Example III was repeated three times using 0.5 gram, 1.0 gram and 1.5 grams of zinc oxide with less twinning than in Example III.

Example V

The procedure of Example I was varied by omitting the initial addition of zinc. After chlorination of the lime slurry at 35 to 40° C. until 105 grams of chlorine was introduced, 2 grams of anhydrous zinc chloride was added to the dibasic slurry and the chlorination was completed at 20° C. The resulting calcium hypochlorite dihydrate crystals were large and mostly untwinned.

Example VI

A slurry of 148 grams of hydrated lime, 4 grams of zinc and 342 grams of water was chlorinated as described in Example I. A 35 ml. portion of the final slurry was centrifuged through a sintered glass frit at 12,000 r.p.m. for 5 minutes. The resulting cake of calcium hypochlorite dihydrate was then free from supernatant liquor. The crystals were large and not twinned.

When the procedure was repeated omitting the zinc, a cake free from supernatant liquor was produced only after centrifuging similarly for a total time of 40 minutes.

Example VII

Triple salt, having the formula

$$Ca(OCl)_2 \cdot NaOCl \cdot NaCl \cdot 12H_2O$$

was produced substantially as described in U.S. Patent 1,787,048 by chlorinating a mixture of caustic soda, calcium hydroxide and water in the proportions of 40:37:180 and cooling to about −10° F. The crystals of triple salt were readily filtered from the liquor.

A slurry of hydrated lime, zinc and water was chlorinated as described in Example I and the resulting calcium hypochloride dihydrate slurry was divided into thirds. To one-third was added with stirring during a period of 1.5 hours, 400 grams of the triple salt previously prepared while maintaining a temperature of 24 to 26° C. The resulting calcium hypochlorite dihydrate slurry was centrifuged to produce a cake containing 38.7% water. When the same procedure was repeated omitting zinc, the cake, centrifuged under the same conditions, contained 44.4% water.

Example VIII

A slurry was prepared by stirring a mixture of 5100 pounds (69 pound moles) of hydrated lime, 100 pounds (1.53 pound moles) of zinc dust and 16,100 pounds (895 pound moles) of water. The molar ratio of Zn/Ca was 0.022:1. The slurry was chlorinated at 20 to 35° C. to produce a slurry of calcium hypochlorite dihydrate. A sample of the slurry was centrifuged for four minutes in a basket-type centrifuge with a 60 x 80 mesh screen at 2700 r.p.m. to produce a cake of calcium hypochlorite dihydrate.

The same procedure was repeated omitting the zinc. The two cakes were analyzed. With zinc, the cake contained 52.87% of $Ca(OCl)_2$ and 38.16% of $H_2O$. Without zinc, the cake contained 45.85% of $Ca(OCl)_2$ and 43.15% $H_2O$.

Example IX

The procedure of Example I was repeated substituting salts of various metals for zinc. Little or no favorable effect on the crystals was observed and they were always small and highly twinned. The additives tested were: $SrCl_2 \cdot 6H_2O$ (30 grams); $ZrOCl_2 \cdot 8H_2O$ (10 grams); $CdCl_2 \cdot 2.5H_2O$ (25 grams); $Al_2(SO_4)_3 \cdot 18H_2O$ (7 grams). In a modified procedure, $BaCl_2 \cdot 2H_2O$ was also found to have no effect on calcium hypochlorite dihydrate crystals.

Example X

The procedure of Example I was repeated using one-fourth the quantities of materials. Substituted for the zinc dust were the following zinc salts and in each case improved crystals of $Ca(OCl)_2 \cdot 2H_2O$ were obtained:

| Example No. | Zinc Salt | Grams |
|---|---|---|
| X | $ZnSO_4 \cdot 7H_2O$ | 1.5 |
| XI | $Zn(C_2H_3O_2)_2 \cdot 2H_2O$ (acetate) | 1.5 |
| XII | $Zn(NO_3)_2 \cdot 5H_2O$ | 1.5 |
| XIII | $ZnC_4H_4O_6 \cdot H_2O$ (tartrate) | 2.3 |
| XIV | $ZnCO_3$ (basic) | 1.5 |
| XV | $Na_2ZnO_2$ (sodium zincate) | 1.5 |
| XVI | $Zn(OH)_2$ | 1.09 |

What is claimed is:

1. Process for the production of crystals of calcium hypochlorite dihydrate having improved filterability by crystallization of calcium hypochlorite dihydrate from aqueous medium containing zinc ions at a temperature of about 20–35° C.

2. Process as claimed in claim 1 in which said calcium hypochlorite dihydrate is formed in said aqueous medium by chlorination of an aqueous slurry of lime.

3. Process as claimed in claim 2 in which said zinc ions are introduced into said aqueous medium by adding zinc dust to said aqueous medium.

4. Process as claimed in claim 2 in which said zinc ions are introduced into said aqueous medium by adding zinc oxide to said aqueous medium.

5. Process as claimed in claim 1 in which said zinc ions are introduced into said aqueous medium by adding a zinc compound to said aqueous medium.

6. Process as claimed in claim 5 in which said zinc compound is a zinc salt of an inorganic acid.

7. Process as claimed in claim 6 in which said zinc salt is zinc chloride.

8. Process as claimed in claim 5 in which said zinc compound is a zinc salt of an organic acid.

9. Process as claimed in claim 8 in which said zinc salt is zinc acetate.

10. Process as claimed in claim 1 in which the molar ratio of zinc to calcium is from 0.001:1 to 0.1:1.

References Cited

UNITED STATES PATENTS

| | | | |
|---|---|---|---|
| 1,718,285 | 6/1929 | George | 23—86 |
| 1,787,048 | 12/1930 | MacMullin et al. | 23—86 |
| 1,937,230 | 11/1933 | Kitchen | 23—86 |
| 2,347,402 | 4/1944 | Day | 23—86 XR |
| 2,506,630 | 5/1950 | Bruce | 23—86 |
| 2,587,071 | 2/1952 | Sprauer | 23—86 |
| 2,963,440 | 12/1960 | Robson | 23—86 XR |
| 2,007,429 | 7/1935 | Klopstock | 23—86 |

NORMAN YUDKOFF, *Primary Examiner.*

V. W. PRETKA, *Assistant Examiner.*

U.S. Cl. X.R.

23—86